H. B. MORRIS.
WEIGHING APPARATUS.
APPLICATION FILED MAR. 16, 1908.
899,551.
Patented Sept. 29, 1908.
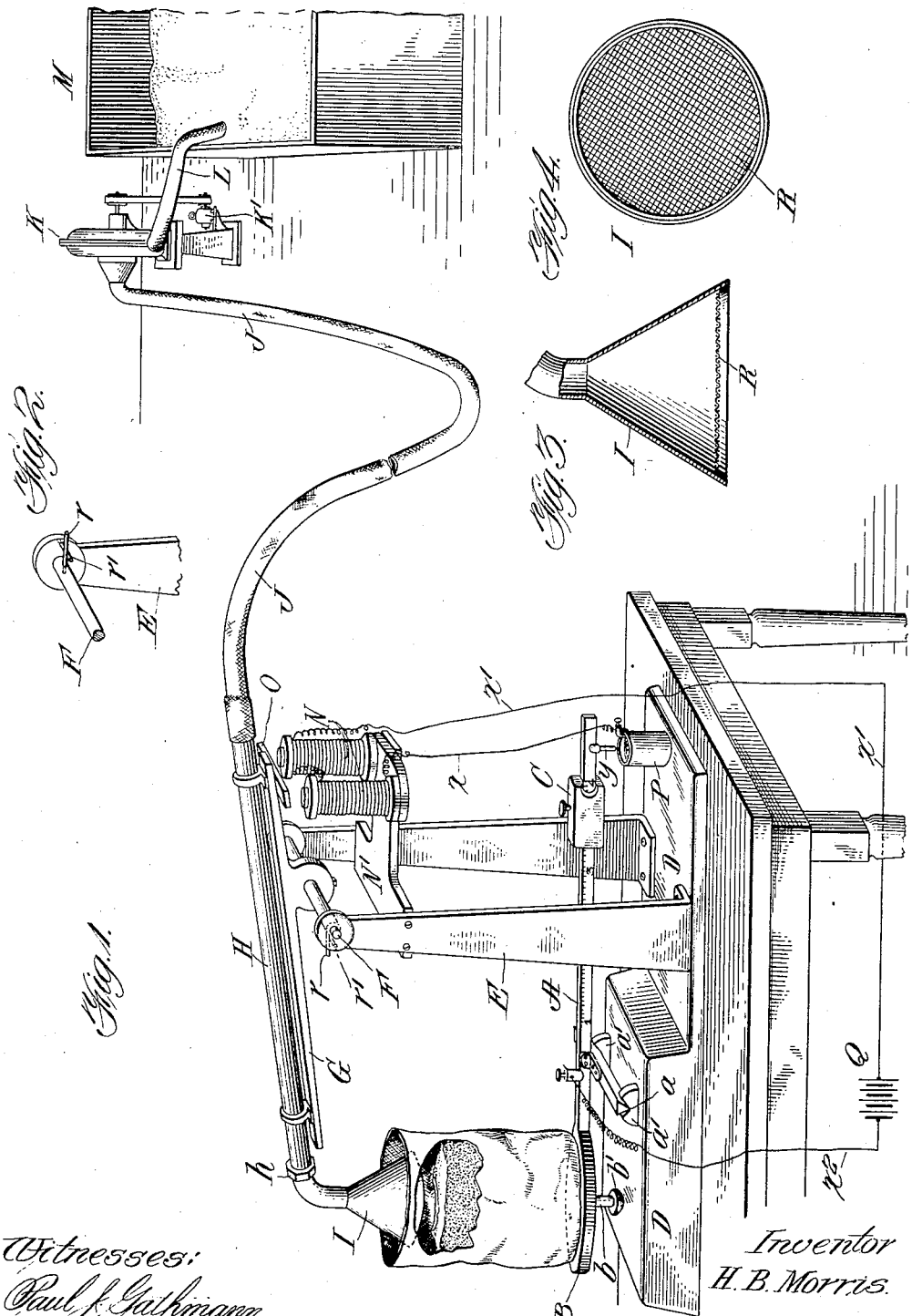
Witnesses:
Paul J. Gathmann
M. L. Adams
Inventor
H. B. Morris
By his Attorneys
Baldwin & Wight

UNITED STATES PATENT OFFICE.

HENRY B. MORRIS, OF GRAND RAPIDS, MICHIGAN.

WEIGHING APPARATUS.

No. 899,551.  Specification of Letters Patent.  Patented Sept. 29, 1908.

Application filed March 16, 1908. Serial No. 421,335.

*To all whom it may concern:*

Be it known that I, HENRY B. MORRIS, a citizen of the United States, residing in Grand Rapids, in the county of Kent and State of Michigan, have invented certain new and useful Improvements in Weighing Apparatus, of which the following is a specification.

My invention relates particularly to the accurate weighing of flour and my improved apparatus will, for convenience, be herein described as used for this purpose, although it is applicable to weighing meal, grain and other substances made up of relatively small particles.

Flour, as is well-known, is largely packed for the market in paper sacks of various sizes, usually representing one-half, one-fourth, one-eighth or one-sixteenth of a barrel. It is now the custom in most large flour-mills when filling the sacks to place them under pipes or spouts leading from a flour-containing hopper and to allow the flour to enter the sacks until they are filled, when the flow of flour is arrested, the filled sacks being removed and replaced by empty sacks. It is not possible in this way to weigh the flour with any great degree of accuracy and inasmuch as it is required that none of the sacks shall be short in weight, it is common to so arrange the filling apparatus that a little more than enough flour shall be admitted to each sack. In large mills this practice results in a considerable loss to the miller, sometimes amounting to several barrels per day and, so far as I am aware, no means have heretofore been provided for recovering the surplus flour which each sack thus contains.

According to my invention the sacks are filled as heretofore, with a surplus of flour, and means are provided by which this surplus is recovered and returned to the hopper or some other suitable receptacle, while the requisite weight of flour is allowed to remain in the sacks.

In carrying out my invention, each sack, after being filled in the usual way, is placed on scales adapted to show the required weight and under a pneumatic suction apparatus or conveyer which, when properly adjusted, withdraws from the sack the surplus flour but which, when the surplus flour has been removed, automatically separates from the sack, leaving the latter to contain only the exact weight required.

In the accompanying drawings, Figure 1 is a perspective view of an apparatus for accurately weighing flour constructed in accordance with my invention. Fig. 2 is a detail view of stop devices forming part of the pneumatic withdrawing device. Fig. 3 is a view in sectional elevation on an enlarged scale of the receiver at one end of the pneumatic withdrawing device. Fig. 4 is an end view thereof.

There are many kinds of scales, balances or weighing devices which may be employed. I have illustrated a simple form of scales comprising a beam A, provided with a cross-bar $a$, having a knife edge and supported in brackets $a'$, in which it is free to rock. At one end of the beam there is a sack-support B and on the opposite portion of the beam there is an adjustable weight C. The brackets $a'$ are formed on or secured to a suitable bed-plate D, from which rise standards E, supporting at their upper ends a rock-shaft F, to which is secured a frame G, carrying a pipe H, to one end of which is detachably connected at $h$ a bell-mouthed receiver I, which is adapted to enter a sack of flour, placed beneath it on the support B of the scales. To the opposite end of the pipe H is attached a flexible pipe or hose J, which connects with a pump, fan or blower K, also connected by a pipe or hose L with a bin or hopper M. The frame G is adapted to oscillate or rock in such manner as to insert the bell-mouthed receiver into a sack of flour beneath it or to be entirely withdrawn therefrom. Normally the receiver is depressed. It is raised by devices presently to be described. The fan is rotated continuously by a suitable motor, such as K'. An electromagnet N is supported on a shelf or bracket N' beneath an armature O, attached to the frame G and this magnet is connected by wire $x$ with a cup of mercury P and by wire $x'$ with a source of electricity Q, which is also connected as illustrated by wire $x^2$ with the scale-beam A, which carries a contact device $y$ adapted to enter the mercury cup P.

The downward movement of the sack-support B is arrested by a cushion of insulating material $b'$ against which a boss $b$, projecting downwardly from the support B, abuts.

In order to arrest the downward movement of the receiver I as it enters the sack and to prevent it from coming into direct contact with the flour, the shaft F is provided with a stop-pin $r$, coöperating with a similar pin $r'$, on one of the standards E.

To prevent lumps from entering the conveyer, a reticulated screen R may be stretched across the mouth of the receiver.

When an over-weighted sack of flour is placed on the support B, the scales will be depressed and the receiver I is placed in the mouth of the sack, as shown in Fig. 1. The electric circuit is then broken at the mercury-cup and the suction produced by the fan K will cause the surplus flour at the top of the sack to be drawn through the conveyer and passed to the bin or hopper M. When nearly all of the surplus flour has thus been withdrawn, the sack-supporting end of scales beam will rise, the contact y will enter the mercury and the electric circuit will be closed, causing the electro-magnet N to attract its armature and the receiver I to rise from the sack and the withdrawal of flour therefrom to be stopped.

The parts of the apparatus may be so adjusted and the current of air through the conveyer be so regulated as to entirely stop the withdrawal of flour from the sack at the instant that the required weight has been reached.

Sacks may in this way have their weight of flour quickly and accurately obtained without loss from handling.

While my invention has been described as especially intended for use in obtaining the accurate weight of flour in sacks, I wish it understood that it is also applicable for a similar purpose to other materials contained in other receptacles. The details of the pneumatic conveyer and the devices for withdrawing it from the receptacle may be varied and other forms of scales or weighing devices may be used.

I claim as my invention,

1. An apparatus for obtaining accurate weight, comprising scales on which a filled receptacle is supported, means adapted to be inserted into and withdrawn from the upper part of the receptacle while on the scales to withdraw surplus material from the upper surface thereof, and devices for arresting the withdrawing action when the desired accurate weight has been obtained.

2. An apparatus for obtaining accurate weight, comprising scales on which a filled receptacle is supported, means adapted to be inserted into and withdrawn from the upper part of the receptacle while on the scales to withdraw surplus material from the upper surface thereof, and devices for automatically arresting the withdrawing action when the desired accurate weight has been obtained.

3. An apparatus for obtaining accurate weight, comprising scales on which a filled receptacle is supported, a pneumatic conveyer adapted to connect with the open mouth at the top of the receptacle for withdrawing surplus material therefrom and devices for arresting the withdrawing action when the desired accurate weight has been obtained.

4. An apparatus for obtaining accurate weight, comprising scales on which a filled receptacle is supported, a pneumatic conveyer adapted to connect with the open mouth at the top of said receptacle for withdrawing surplus material from the top thereof, and devices for automatically arresting the withdrawing action when the desired accurate weight has been obtained.

5. An apparatus for obtaining accurate weight, comprising scales on which a filled receptacle is supported, a receiver adapted to enter the mouth at the top of said receptacle, a conveyer connecting the receiver with a place for storage, and means for stopping the withdrawal of surplus material from the receptacle when the desired accurate weight has been obtained.

6. An apparatus for obtaining accurate weight, comprising scales on which a filled receptacle is supported, a receiver adapted to enter the receptacle, a conveyer connecting the receptacle with a place for storage, and means for automatically arresting the withdrawing action of the conveyer when the desired accurate weight has been obtained.

7. An apparatus for obtaining accurate weight, comprising scales on which a filled receptacle is supported, a receiver adapted to connect with the filled receptacle, a pneumatic conveyer connecting the receiver with a place for storage, and means for arresting the withdrawing action of the conveyer when the desired accurate weight has been obtained.

8. An apparatus for obtaining accurate weight, comprising scales on which a filled receptacle is supported, a receiver adapted to be connected with and disengaged from the filled receptacle, a pneumatic conveyer connecting the receiver with a place for storage, and means for automatically arresting the withdrawing action of the conveyer when the desired accurate weight has been obtained.

9. An apparatus for obtaining accurate weight, comprising scales on which a filled receptacle is supported, a pneumatic conveyer adapted to connect said receptacle with a place for storage, and electro magnetic devices for arresting the withdrawing action of the conveyer when the desired accurate weight has been obtained.

10. An apparatus for obtaining accurate weight, comprising scales on which a filled receptacle is supported, a receiver adapted to enter the mouth of the filled receptacle, a rocking conveyer pipe to which said receiver is connected, a suction apparatus connected with said conveyer pipe and connected also with a place for storage and electro magnetic devices operated by the movement of the scales to arrest the withdrawing action of said withdrawing devices when the desired accurate weight has been obtained.

11. An apparatus for obtaining accurate weight, comprising scales on which a filled receptacle is supported, a receiver adapted to enter the open mouth at the top of the receptacle, a pneumatic conveyer connecting the receiver with a place for storage, and electro magnetic devices operated by the scales for automatically arresting the withdrawing action of the conveyer when the desired accurate weight has been obtained and the scales rise.

In testimony whereof, I have hereunto subscribed my name.

HENRY B. MORRIS.

Witnesses:
E. L. MONTGOMERY,
JOSEPH KIRWIN.